United States Patent

[11] 3,598,492

[72] Inventor  Frank Fruengel
              105 A, Herivigredder, D2 Hamburg 56,
              Germany
[21] Appl. No. 887,303
[22] Filed     Dec. 22, 1969
[45] Patented  Aug. 10, 1971
[32] Priority  Dec. 20, 1968
[33]           Germany
[31]           G 68 12 334.2-7101

[54] OPTICAL CALIBRATING DEVICE INCLUDING LIGHT DIFFUSERS ARRANGED TO SIMULATE A PATH OF BACK-SCATTERED LIGHT
11 Claims, 1 Drawing Fig.

[52] U.S. Cl. ................................................ 356/103,
                                               250/218, 356/201
[51] Int. Cl. .......................................................G01n 21/00
[50] Field of Search.............................................356/4, 5, 6,
                       103, 104, 201, 207, 208, 210, 243; 250/218

[56]              References Cited
              UNITED STATES PATENTS
3,234,846   2/1966   Cropper et al. ................  356/104
              FOREIGN PATENTS
1,088,437  10/1967   Great Britain................   356/5

OTHER REFERENCES

Beuttell et al.: " Instruments For The Measurement Of The Visual Range" Journal of Scientific Instruments vol. 26 Novemeber 1949, pages 357— 59

McIntyre: " An Absolute Light Scattering Photometer: II Direct Determination Of Scattered Light From Solutions" Journal of Research Vol. 68A, No. 1. Jan – Feb 1964 pages 87— 96

Primary Examiner—Ronald L. Wibert
Assistant Examiner—F. L. Evans
Attorney—Michael S. Striker ABSTRACT: Cooperating first and second light diffusers are arranged such as to simulate a path of backscattered light between a light impulse transmitter and receiver. The light diffusers respectively extend at inclined angles relative to each other and to the transmitter and receiver. The first diffuser is operative for diffusely reflecting incident light from the transmitter to the second diffuser and the latter is operative for diffusely reflecting incident light from the first diffuser to the receiver. A diaphragm with adjustable apertures between the second diffuser and the receiver varies the amount of light reflected to the receiver to thereby permit simulation of different visual ranges.

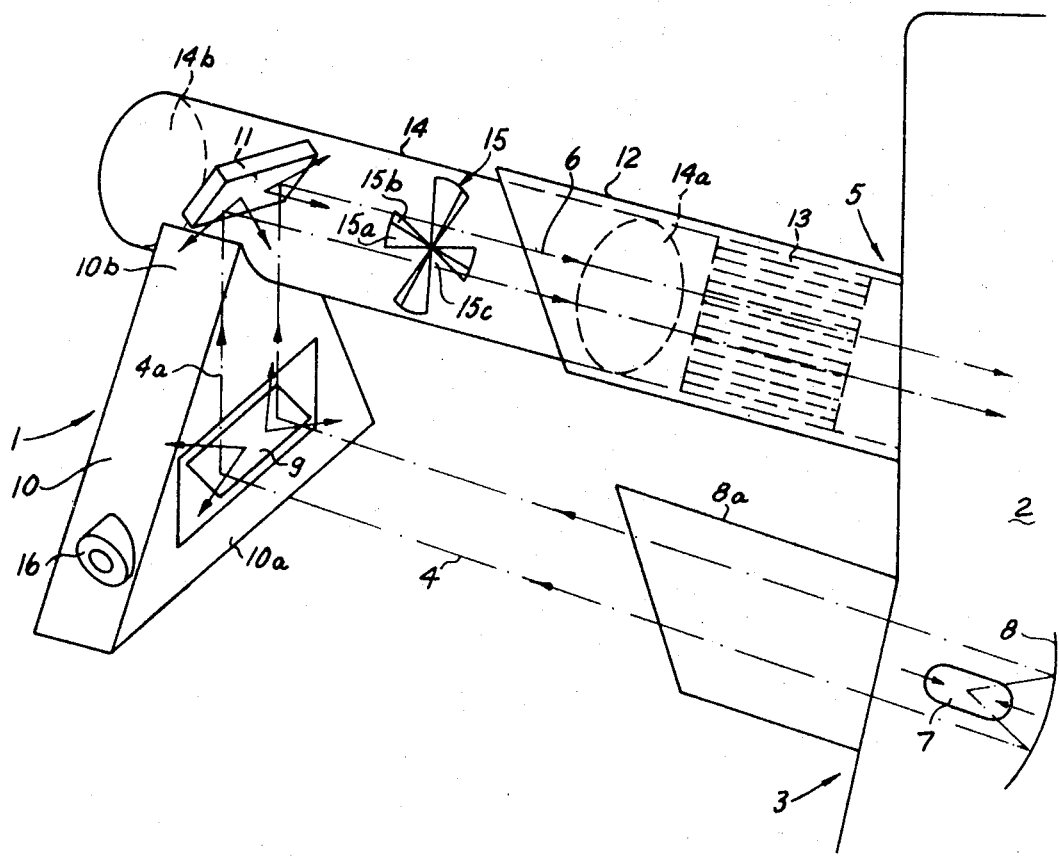

OPTICAL CALIBRATING DEVICE INCLUDING LIGHT DIFFUSERS ARRANGED TO SIMULATE A PATH OF BACK-SCATTERED LIGHT

BACKGROUND OF THE INVENTION

The present invention relates to an optical calibrating device especially for use for gaging the light impulse transmitter and receiver of visual range meters for metering backscattered light.

Known in the art are visual range meters for metering the amount of backscattered or forward-scattered light between a light impulse transmitter and receiver.

Such visual range meters, occasionally, require calibration, for example following repair or replacement of vital components of the meters.

With visual range meters for metering forward-scattered light and which, with reference to a given test criterion, determine how much of the light reflected by the transmitter reaches the receiver, calibration offers no difficulties for reasons that the various visual ranges can easily be simulated with the help of absorption filters, known as such.

However, with visual range meters for metering backscattered light and which determine to what degree light transmitted by a sender is backscattered by fog droplets, dust particles or smoke to the receiver, and which, at present time, are widely used in aeronautics for determining the visual range ratio during takeoff and landing of aircraft, calibration is problematic in that, hitherto, no suitable or practical calibrator has been developed to calibrate this latter-type meters. Calibration of such meters thus far, was accomplished by comparison measurements with other already calibrated meters.

This manner of calibration, of course, is burdensome and unsuitable for present-day technological requirements.

SUMMARY OF THE INVENTION

Object of the present invention is to overcome the above disadvantages as regards the calibration of visual range meters for measuring the amount of backscattered light and to provide a simple but effective and direct-computing calibrating device for such visual range meters.

Moreover, it is an object of the invention to provide such a calibrating device which, as a result of its construction, can readily and in the shortest time possible, be conveniently coupled to the visual range meter.

Such a calibrating device especially for use for gaging the light impulse transmitter and receiver of visual range meters for metering backscattered light comprises optical means for simulating a path of backscattered light between the transmitter and the receiver. The optical means include cooperating first and second light diffusing members respectively extending at inclined angles relative to each other and to the transmitter and receiver. The first of these members diffusely reflects incident light from the transmitter to the second light diffusing member while the latter, in turn, diffusely reflects incident light from the first member to the receiver. A diaphragm with adjustable apertures between the second light diffusing member and the receiver controls the amount of light to the receiver to thereby permit simulation of a wide variety of different visual ranges.

The novel features which are considered as characteristic of the invention are set forth in particular in the appended claims. The improved optical calibrating device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

The single Figure of the drawings illustrate the calibrating device according to the present invention and especially adapted for use for gaging the light impulse transmitter and receiver of visual range meters for metering FIGURE light.

DESCRIPTION OF THE PREFERRED EMBODIMENT

Referring now to the single FIGURE, the schematically illustrated calibrating device 1 is seen to be coupled to a visual range meter 2 for metering backscattered light and which incorporates a transmitter section 3 operative for transmitting light impulses 4 to the calibrating device and a receiver section 5 operative to receive the backscattered light impulses 6 from the calibrating device.

As shown, the transmitter section 3 essentially comprises a light impulse source 7 for the production of light impulses and a reflector 8 which, via a projector 8a, reflects the impulses 4 in direction toward a first light diffuser plate 9 which is accommodated in the region of the bottom portion 10a of a base support 10 and which extends at an inclined angle relative to the reflector 8 and relative to a cooperating second light diffuser plate 11. Light, in the form of the impulses 4, incident on the first plate 9 is diffusely reflected by the same in accordance with Lambert's law, with but a small quantity 4a of the impulses 4 reflected to the second plate 11.

The second plate 11, in turn, diffusely reflects the incident light from the first plate 9 to the receiver section 5 of which only the tubular jacket 12 and the honeycomb grid 13 are shown. The tubular jacket 12 encloses the optical system, not shown, of the receiver section 5 and further is operative to slidably receive the outer end 14a of a tubular housing 14 of the calibrating device. The tubular housing 14 extends from the upper end 10b of the base support 10 and is connected thereto with its inner end 14b. This inner end opens into the base support 10 so as to permit interaction between the second plate 11 positioned at this end in the tubular housing 14, and the first plate 9 in the base support.

The second plate 11 likewise extends at an inclined angle relative to the first plate 9 and relative to the receiver section 5.

Through the above arrangement, a simulated substantially U-shaped path of light impulses is constituted between the transmitter section 3 and the receiver section 5 via the first and second plates 9 and 11, respectively, i.e., the respective plates are positioned such with reference to the transmitter and receiver section that light passing from the former to the latter via the light diffusing plates is compelled to traverse the substantially U-shaped path.

The U-shaped path defines two spaced substantially parallel path portions and a transverse path portion connecting the two parallel path portions and the first and second plates 9 and 11, as shown, are located at the intersections of the transverse path portion with the respective parallel path portions.

Located in the tubular housing 14 in the path of the impulses 6 and intermediate the second plate 11 and the receiver section 5, is a diaphragm 15 having two substantially cross-shaped sections 15a and 15b which are movable relative to each other and define slotted apertures 15c between themselves which, depending on sliding adjustment of one of the cross-shaped sections relative to the other, are widened or lessened in width. This permits the control and adjustment of the amount of light passing from the second plate 11 to the receiver section 5, which, in turn, enables the simulation of different visual ranges. The cross-shaped sections 15a, 15b may be controlled exteriorly of the tubular housing 14 in any conventional or desired manner. In this manner, the diaphragm 15 suitably meters the amount of the twice diffusely backscattered light which should reach the receiver section 5.

At least one of the light diffusing plates 9, 11 is adjustable along its longitudinal axis of symmetry so as to adjust the respective angle of inclination of the plate with reference to either the transmitter section 3 or the receiver section 5.

As shown in the preferred embodiment, the first plate 9, by means of a collimating screw 16, is tiltable about its longitudinal axis of symmetry relative to the light impulses 4 emanating from the transmitter section 3.

The reflecting surfaces of the plates 9, 11 are dull finished or otherwise roughened and arranged such that incident beams of light upon the plates are diffusely reflected in practically all directions but, as hereinbefore explained, only a small quantity can reach the second plate 11. The plates, as such, are made of glass.

The diaphragm 15, moreover, may comprise a calibrating scale, not shown, to indicate different visual ranges.

As a result of blending of various granulations which constitute the light diffusing surfaces of the plates, the above calibrating device suitably acts as a vapor or fog wall with droplets of varying orders of magnitude.

It will be understood that each of the elements described above, or two or more together, may also find a useful application in other types of optical calibrating devices differing from the types described above.

While the invention has been illustrated and described as embodied in the single FIGURE, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desired to be protected by Letters Patent is set forth in the appended claims:

1. A calibrating device especially for use for gaging the light impulse transmitter and receiver of visual range meters for metering back scattered light, the combination comprising, optical means for simulating a path of backscattered light between the light impulse transmitter and receiver, said optical means comprising cooperating first and second light diffusing members respectively extending at inclined angles relative to each other and to said transmitter and receiver, said first member being operative for diffusely reflecting incident light from said transmitter to said second member, and said second member being operative for diffusely reflecting incident light from said first member to said receiver; and light adjusting means for varying the amount of flow of scattered light in said calibrating device on to said receiver and to thereby permit simulation of different visual ranges.

2. A device as defined in claim 1, wherein said first and second light diffusing members have roughened light diffusing surfaces.

3. A device as defined in claim 2, wherein said light diffusing surfaces are dull-finished.

4. A device as defined in claim 2, wherein said light diffusing surfaces are made of a fine-granular material.

5. A device as defined in claim 2, wherein said first and second light diffusing members are made of glass.

6. A device as defined in claim 1, wherein said first and second light diffusing members are tiltable about their longitudinal axis of symmetry so as to adjust the respective inclined angles of said members.

7. A device as defined in claim 1, wherein said first and second light diffusing members are so positioned with reference to said transmitter and said receiver that light passing from the former to the latter via said light diffusing members and said light adjusting means is compelled to traverse a substantially U-shaped path having two spaced at least substantially parallel path portions and a transverse path portion connecting said parallel path portions, said light diffusing members being located at the intersections of said transverse path portion with the respective parallel path portions.

8. A device as defined in claim 7, wherein said light adjusting means is located in one of said two at least substantially parallel path portions intermediate said second light diffusing member and said receiver.

9. A device as defined in claim 8, wherein said light adjusting means is a diaphragm having a plurality of adjustable apertures extending in the path of light reflected from said second light diffusing member to said receiver.

10. A device as defined in claim 9, wherein said light adjusting means comprises a calibrated scale to indicate different visual ranges.

11. A device as defined in claim 1, and comprising a housing including a base portion accommodating said first light diffusing member, and a tubular arm portion extending from and connected to said base portion, said arm portion having an inner end portion opening into said base portion and accommodating said second light diffusing member, and an outer open end portion removable coupled to and communicating with said receiver, and wherein said light-adjusting means is a diaphragm having adjustable aperture means and located in said arm portion intermediate said second light diffusing member and said receiver.